United States Patent [19]

McCreery

[11] 4,011,049
[45] Mar. 8, 1977

[54] METHOD OF AND DEVICE FOR HOLDING A CUTTING INSERT IN THE POCKET OF A TOOL HOLDER

[75] Inventor: James F. McCreery, Latrobe, Pa.
[73] Assignee: Kennametal Inc., Latrobe, Pa.
[22] Filed: Sept. 19, 1975
[21] Appl. No.: 614,975
[52] U.S. Cl. .................................................... 29/96
[51] Int. Cl.² .............................................. B26D 1/00
[58] Field of Search ............................... 29/96, 453

[56] References Cited
UNITED STATES PATENTS

| 2,230,916 | 2/1941 | Tinnerman | 29/453 X |
| 3,137,059 | 6/1964 | Hertel | 29/96 |
| 3,268,978 | 8/1966 | Reck | 29/96 |
| 3,341,923 | 9/1967 | Kelm | 29/96 |
| 3,546,758 | 12/1970 | Stier | 29/96 |
| 3,710,468 | 1/1973 | Calvert | 29/96 |

Primary Examiner—Leonidas Vlachos
Attorney, Agent, or Firm—Lawrence R. Burns

[57] ABSTRACT

A tool holder having an insert receiving pocket, the pocket having bottom wall and side wall means with an improved arrangement for and method of providing quick indexing or complete changing of an indexable insert. The improved arrangement comprises a pin element with a conical head on one end for engagement with a cutting insert and cooperating elements of a press-on, pry-off connection between the end of the pin and the tool holder. The insert and pin element are detachably fastened together as one unit, and when the insert is in the pocket with the pin clamped to the holder, the unit is held securely in position for cutting engagement with a workpiece.

6 Claims, 8 Drawing Figures

METHOD OF AND DEVICE FOR HOLDING A CUTTING INSERT IN THE POCKET OF A TOOL HOLDER

COPENDING APPLICATION

U.S. patent application Ser. No. 615,555, filed Sept. 22, 1975, entitled "DEVICE FOR HOLDING A CUTTING INSERT IN THE POCKET OF A TOOL HOLDER," Inventors James W. Heaton and Kenneth L. Niebauer.

BACKGROUND OF THE INVENTION

The arrangement of the present invention has been developed primarily for applications involving heavy duty tooling. In cases where metal removal rate must be maintained high, extreme conditions of heat and pressure loading are encountered which must be dealt with efficiently and effectively.

One of the first problems encountered is that of holding the cutting insert securely in the pocket of a tool holder against erratic conditions of load pressure and vibration. At the beginning of a cutting operation, the sudden transition from no load to extreme pressure load on the insert can cause the insert to shift position in the holder and thereby effect the accuracy of the planned cut.

At the end of the cutting operation, the sudden disengagement of the cutting insert from the workpiece causes the pressure load suddenly to be removed from the insert and this sudden change in load can, also, cause the insert to shift and distress any repeatable dimensional accuracy which is essential for most tool holders, especially those used on Numerically Controlled machines, to meet.

During the cutting operation, loads of up to 35,000 pounds may be encountered on the cutting insert which, if the insert is not precisely located and firmly held in the holder to begin with, can also cause shifting of the insert during the cutting operation. It is, therefore, of first importance to provide a tool holder that can precisely and securely seat a cutting insert and then securely hold the cutting insert in location during all phases of the heavy duty cutting operation.

When taking a heavy duty cut, such as described above, the efficiency of removing the metal from a workpiece is, thus, to be maximized. The rate of metal removal rate from a workpiece is, however, only one part of the efficiency factor. When using indexable cutting inserts, there comes a point in time when the cutting edge becomes worn and must be replaced with a fresh cutting edge.

To change a cutting edge, the cutting action must be stopped and the machine operator must index the cutting insert to a new cutting edge or replace the cutting insert altogether if all of the cutting edges thereof have become worn. The time it takes the operator to make this change directly affects the effficiency or metal removal rate of a particular machine.

The operator, having stopped the machine after some very heavy duty cutting, now has the situation that the insert he is about to change or index is extremely hot; in fact, too hot to be handled without gloves, rags, or other protection by the operator. Most gloves and other protection worn by the operator are cumbersome to them and, therefore, any system used for locating and seating a cutting insert in a tool holder, should recognize that a minimum of tools should be used at this point, or that if tools are used, they should be of sufficient size and utility to be used by the operator while using gloves or other protective equipment.

Most of the clamps used in heavy metal cutting today require top clamps above the insert and some type of superstructure on the top face of the insert. It has recently been found that these superstructures may not be desirable in that, as the chip runs across the top face of the insert and strikes the superstructure, a significant back pressure is put on the tool holder and consumes unnecessary horsepower from the machine. Inserts have recently been developed wherein chip control may be had without these power consuming superstructures and, therefore, any positive clamping device which obstructs the top face of the insert is not desirable.

Pin type holders must necessarily be used wherein the upper end of the pin is below the top face of the cutting insert and yet the pin firmly locates and holds the cutting insert in the pocket of the tool holder against the extreme pressure loading of heavy duty cutting.

Most of the pin type holders of the prior art were defective in that the pin type clamps merely held the insert down in the pocket without insuring that the insert was positioned or held back against one side wall of the pocket or the pin type holders mainly held the insert back against a side wall means of the pocket without holding the insert down in the pocket and, therefore, did not prevent fluttering of the insert during extreme conditions.

It is, therefore, an object of the present invention to provide a tool holder having a pin-type clamp that is extremely simple to operate, efficient and fast acting, and while, further, is operable to positively locate the cutting insert down against the bottom wall and back against a side wall of an insert recess pocket while, further, being rigid and strong enough to hold the insert in a fixed location in the holder during the extreme and erratic conditions of load pressure and heat accumulation encountered during a heavy duty cutting operation.

A further object is the provision of a new method of holding a cutting insert in a tool holder pocket which permits rapid indexing or exchanging of the insert.

BRIEF SUMMARY OF THE INVENTION

A tool holder is provided with an insert receiving pocket having bottom wall and side wall means. A hole extends downwardly from the bottom wall of the pocket in the tool holder. A central hole is provided in an indexable cutting insert and a pin element is extended through the central hole. One end of the pin element has a conically shaped head to engage the insert from above with means on the body of the pin to detachably hold the insert and preferably a shim member near the upper end of the pin.

Cooperating elements of a press-on, pry-off connection are provided on the other end of the pin element and the tool holder to hold the pin, with certain forces exerted thereon, in the tool holder. The side wall means of the pocket is spaced closer to the central axis of the hole in the tool holder than is the axis of the central hole of the insert when the insert is seated in the pocket and abutted against the bottom and side wall means of the pocket.

The length of the pin from the head to the other end of the pin that engages the connection element on the tool holder is spaced so that the head of the pin is biased downward with a constant predetermined force. The conically shaped head of the pin distributes this biased downward force so that the insert is held back against the side wall means while also being held down against the bottom wall of the pocket.

The outer extremities of the side wall means, at least at the upper edges, are relieved, or notched, to provide a space for receiving insert cutting edges, which may have mushroomed over during cutting, so that any corners that have been mushroomed will not interfere with location of the insert in the tool holder when the insert is indexed to a new position in the holder.

The exact nature of the present invention will become more clearly apparent upon reference to the following detailed description taken in connection with the accompanying drawings in which.

DETAILED DESCRIPTION OF THE INVENTION

Figure 1:
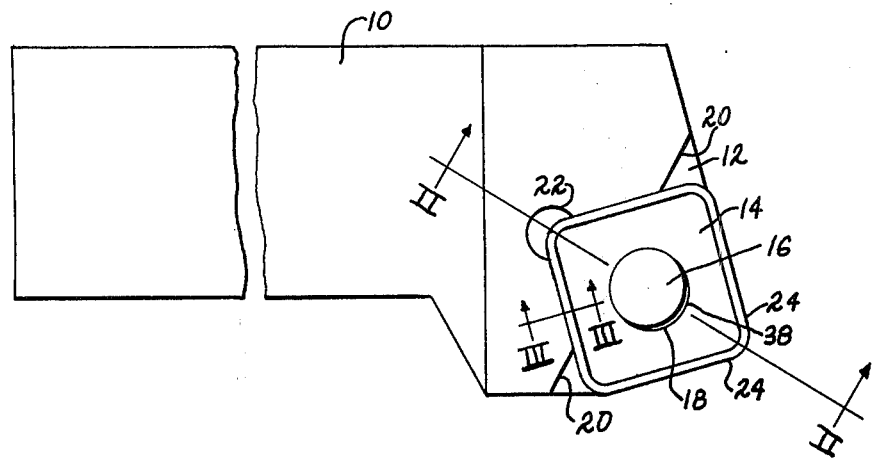
FIG. 1 is a plan view of a tool holder according to the present invention with a cutting insert mounted thereon.

In FIG. 1 is shown a tool holder 10 which has, at its forward end, an insert receiving pocket 12. Seated in the insert receiving pocket 12 is an indexable cutting insert 14. As can be seen in FIG. 1, the top of a pin element 16 is engaged with a central hole 18 in cutting element 14. More details of this engagement will be shown in FIG. 2.

The top view of FIG. 1 also shows relief notches 20 and 22 which are provided on the holder near the insert receiving pocket to provide clearance for any cutting edges 24 of cutting insert 14 which may be mushroomed over after having been used.

Figure 2:
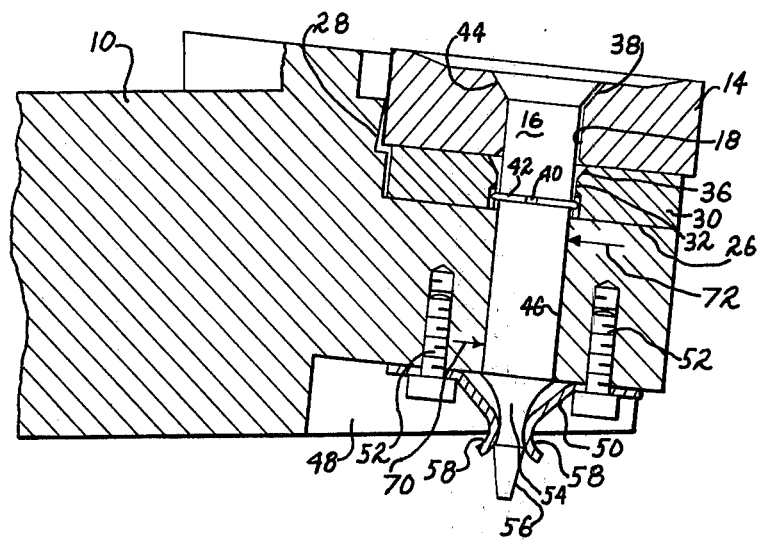
FIG. 2 is a vertical longitudinal section indicated by line II—II on FIG. 1 and showing more in detail the cutting insert mounting arrangement.

Referring now to FIG. 2, which is a sectional view of the insert locating and locking arrangement, the insert receiving pocket 12 will be seen to have a bottom wall means 26 and side wall means 28. In this particular case, a shim element 30 and a cutting insert 14 are shown in pocket 12. Shim element 30 has a central hole 32 provided therein, a bottom portion of which has an enlarged counterbore portion 34 with a tapered upper end and the top portion of center bore 32 has an upwardly facing tapered or conical portion 36.

The cutting insert 14 has a central through hole 13 therein, and near the top portion of the center hole 13, there is an upwardly facing tapered or conical recess 38. The pin element 16 and the cutting insert 14 and the shim element 30 are all held in detachable relationship with one another by a groove 40 and wire locking element 42 which are located on pin element 16.

The groove 40 on pin element 16 extends around the periphery of the pin element and wire element 42 is sized so as to be seated in groove 40 and yet protrude radially outward from pin 16 so as to be freely received in the counterbore portion 34 of the shim while being engageable with the shoulder at the bottom of the counterbore portion. Wire element 42 can, however, readily be forced through the center holes in the shim and the insert.

When assembling the slim 30, the cutting insert 14 and the pin element 16, and pin element is extended down through the central hole of cutting insert 14 with the wire locking element 42 being pressed through the center hole in cutting insert 14 until enlarged head portion 44 on pin element 16 engages the upwardly facing, radially opening recess 38 on cutting insert 14.

Next, the shim element 30 is brought up the shank of pin element 16 and the radially opening recess 36 compresses wire element 42 into groove 40 until the wire element 42 can pass through the center hole 32 of shim element 30. After the wire element 42 has passed through center hole 32 and reached the enlarged counterbore portion 34, the wire element expands and thereby holds shim element 30 and cutting insert 14 on the pin element 16 near the upper end thereof.

Shim element 30 is provided with a downwardly facing conical shoulder portion between enlarged counterbore 34 and center hole 32 so that a predetermined amount of downward force on shim element 30 will operate to detach shim element 30 and cutting insert 14 from pin 16.

With the above combined elements of cutting insert 14, shim element 30 and pin 16 having been this far described, the tool holder 10 has been provided, as has been mentioned, with the bottom wall means 26 and side wall means 28, for receiving the combined elements. Further, the tool holder 10 has been provided with a through hole 46 extending downwardly from bottom wall means 26 in the tool holder 10.

In FIG. 2, hole 46 will be seen to be a through hole in tool holder 10 opening at the bottom into a slotted recessed portion 48. Located in the bottom recessed portion 48 at the bottom of the through hole 46 is a retaining spring clip 50 which is fastened by bolts 52 which threadedly engage tool holder 10. The pin element 16, as has been mentioned, has an enlarged head portion 44 at the upper end for engaging cutting insert 14 and also has an opposed lower end. The lower end of pin 16, indicated at 54, is adapted to engage retaining spring clip means 50 when pin element 16 is extended downwardly through hole 46.

The lower end 54 of pin element 16 and the retaining spring clip 50 form cooperating elements of a press-on, pry-off connection which is used to secure cutting insert 14 and shim element 30 in pocket 12 of tool holder 10. Lower end 54 of pin element 16 is in the shape of a necked down recess having a conically shaped forward end 56 to force the fingers 58 of retaining spring clip means 50 apart as the pin element 16 is forced downwardly.

Upwardly on pin element 16 from the conically shaped surface 56, the pin element is sharply recessed radially inwardly and then slopes upwardly and radially outwardly until the recess meets the main shank of pin element 16. This particular configuration described for the lower end of the pin element provides a constant downward force on pin 16 and insert 14 when the cooperating elements 50 and 54 of the press-on, pry-off connection are engaged.

As can be seen in FIG. 2, the distance from the contact area of side wall means 28 to the central axis of hole 46 in tool holder 10 is designed so as to be slightly less than the distance from a side wall of the cutting insert 14 to the axis of the central through hole 18 of the insert. This slight offset and the correct sizing of the diameter holes 13 and 46 and the shank diameter of pin 16 will cause a rearward clamping action of cutting insert 14 against side wall means 28 of the tool holder pocket.

The shank of pin element 16 will bear against portions of through hole 46 indicated by arrows 70 and 72 when the cooperating elements 50 and 54 of the press-on, pry-off connection are engaged, forcing the upper parts of pin 16 toward side wall means 28 of the pocket to hold cutting insert 14 back against side wall means 28.

Figure 3:
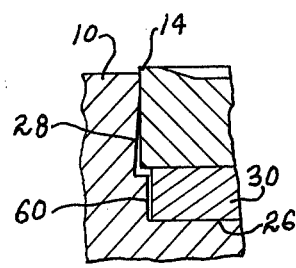
FIG. 3 is a sectional view indicated by line III—III on FIG. 1 and showing a preferred construction of a side wall means of a pocket in a tool holder.

In FIG. 3 is shown a configuration of side wall means 28 on tool holder 10 with the side wall means extending downwardly from the top of tool holder 10 and is slanted away from the side wall of insert 14. Beneath insert 14, shim element 30 is seated against the bottom wall means 26, but the side wall 60 of side wall means 28 does not abut any side walls of shim element 30.

Side wall means 28 is designed, however, to contact an upper portion of a side wall of cutting insert 14 and provide a solid line contact with cutting insert 14 to assure positive location of cutting insert 14 as each side is indexed into abutment with side wall means 28. Further, the angling of side wall means 28 provides that, when the insert is engaged with a metal workpiece, the lateral force being exerted on cutting insert 14 holds it firmly back against the side wall means 28.

The head of the pin, as mentioned, holds the insert and shim downwardly on the bottom wall of the pocket. The angling of side wall means 28 further allows tool holder 10 to accommodate a double sided cutting insert should that be desirable in that any used mushroomed cutting edges that are turned down will have clearance and, therefore, not brinell the side wall of the insert receiving pocket in tool holder 10.

Figure 4:
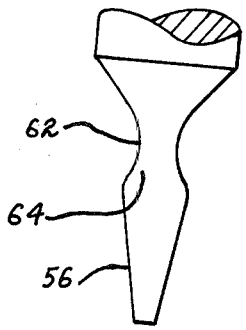
FIG. 4 is a fragmentary view showing how the lower end of the insert clamping pin element is formed.

What is shown in FIG. 4 is a partial portion of the lower end 54 of pin element 16 with the forward conical end 56 and the radially inward recess 62 immediately above the conical end 56. It is important that a bearing area 64 be located immediately above the forward concially shaped portion 56 to engage at least a finger 58 of retaining spring clip means 50 so that a part of the horizontal force exerted on the pin element by the spring clip becomes a vertical force component acting downward on pin element 16 and cutting insert 14.

Figure 5:
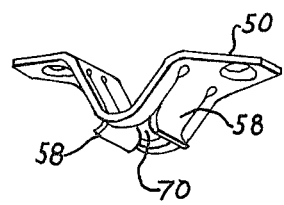
FIG. 5 is a perspective view showing a retaining spring clip used in accordance with the present invention.

Shown in FIG. 5 is a retaining spring clip means that can be used in the present invention and having fingers 58 to provide resilient resistance to a correctly sized member which may be pressed downwardly through hole 70, once the retaining spring clip means 50 is fastened, as by the bolts 52 on tool holder 10.

Figure 6:
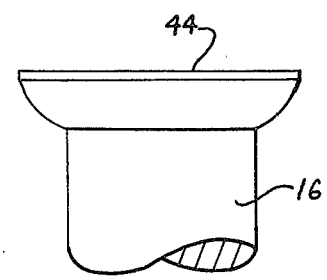
FIG. 6 shows one form which the head of the pin element can take.

Shown in FIG. 6 is pin element 16 having enlarged head portion 44 for engagement from above with cutting insert 14 and shaped so as to curve outward and upwardly from the shank of pin element 16 and thereby be capable of transferring a force with vertical and horizontal components to cutting insert 14.

Figure 7:
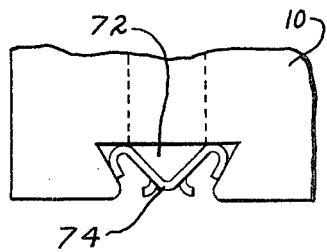
FIG. 7 shows a modified retaining spring clip adapted to be held captive in a groove in the holder.

FIG. 7 shows a modification in which the bottom of the tool holder is formed with a dovetail groove 72 and mounted therein is a spring clip 74 which is substantially the same as spring clip 50 of FIG. 4 except that the end portions of the side extremities are curved backwardly so that the spring clip 74 can be pressed into dovetail groove 72 and will remain captive therein. The only essential difference between the modification of FIG. 7 and the modification described above is that the spring clip is not held on with screws but is merely captive in a dovetail groove.

Figure 8:
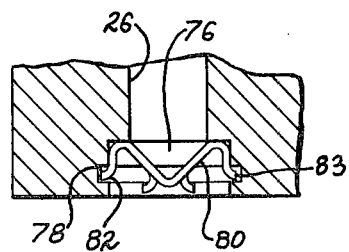
FIG. 8 shows yet another modified retaining spring clip that is also captive in a bore in the tool holder.

In FIG. 8, the holder is provided with a counterbore 76 extending upwardly therein and coaxial with hole 26 in the holder. The counterbore has a groove 78 therein between the ends and spring clip 80 is receivable in the counterbore with the side terminal portions being provided with tabs 82 which snap into groove 78. The modification of FIG. 8 is the same as those previously described except the spring clip is retained in a slightly different manner on the holder.

The pin element 16, it will be evident, is received in hole 46 in the tool holder with a small clearance, say, about 0.007 inches on the diameter. Due to this clearance, pin element 16 can tilt in hole 46 an amount up to about one-half degree in exerting the rearwardly directed force on the insert which presses the insert against the side wall means of the pocket in the holder.

Modifications may be made within the scope of the appended claims.

What is claimed is:

1. In a holder for supporting a cutting insert wherein the holder has an insert receiving pocket with a bottom wall and side wall means and a pin element which extends downwardly through a hole in the insert and a hole in the holder to hold the insert securely against the side wall means of the pocket, the improvement which comprises: one end of said pin element adapted to engage the insert from above, cooperating elements of a press-on, pry-off connection, one of said cooperating elements comprising a spring clip located on the holder and the other element located near the other end of the pin element, the axis of the hole in the holder being offset toward the side wall means of the pocket from the axis of the hole in the insert when said insert is abutted against the bottom and side walls of said pocket, the pin element adapted to engage the lateral surfaces of the holes in the insert and the holder and hold said insert against at least the side wall means when said cooperating elements of a press-on, pry-off connection on said holder and pin element are engaged.

2. The improvement according to claim 1 in which said one end of said pin element adapted to engage the insert from above has a downward facing conically shaped head portion.

3. The improvement according to claim 2 in which the cooperating elements of a press-on, pry-off connection comprise said spring clip and a recessed portion near said other end of said pin such that a predetermined downward force on said pin element is provided when said cooperating elements are engaged.

4. The improvement according to claim 3 in which said means on said tool holder comprises a retaining spring clip mounted on the underside of said tool holder near the lower end of said hole in the tool holder.

5. The improvement according to claim 2 in which the top face of said insert has a central conical recess formed in said hole of said insert and adapted to engage said downward facing conically shaped head portion of said pin element.

6. The improvement according to claim 5 in which the pin element, when inserted through the insert, and the cooperating elements of a press-on, pry-off connection are engaged, holding said insert against both the bottom and side walls of said pocket in said tool holder.

* * * * *